US011178746B2

(12) United States Patent
Friedel et al.

(10) Patent No.: US 11,178,746 B2
(45) Date of Patent: Nov. 16, 2021

(54) PROTECTIVE NOZZLE CAP, PLASMA ARC TORCH COMPRISING SAID PROTECTIVE NOZZLE CAP, AND USE OF THE PLASMA ARC TORCH

(71) Applicant: KJELLBERG-STIFTUNG, Finsterwalde (DE)

(72) Inventors: Jens Friedel, Brieske (DE); Timo Grundke, Finsterwalde (DE); Volker Krink, Finsterwalde (DE)

(73) Assignee: KJELLBERG-STIFTUNG, Finsterwalde (DE)

( * ) Notice: Subject to any disclaimer, the term of this patent is extended or adjusted under 35 U.S.C. 154(b) by 180 days.

(21) Appl. No.: 16/340,220

(22) PCT Filed: Oct. 6, 2017

(86) PCT No.: PCT/EP2017/075482
§ 371 (c)(1),
(2) Date: Apr. 8, 2019

(87) PCT Pub. No.: WO2018/065578
PCT Pub. Date: Apr. 12, 2018

(65) Prior Publication Data
US 2020/0045804 A1 Feb. 6, 2020

(30) Foreign Application Priority Data
Oct. 6, 2016 (DE) ..................... 10 2016 219 350.3

(51) Int. Cl.

| | |
|---|---|
| ***B23K 10/00*** | (2006.01) |
| ***H05H 1/34*** | (2006.01) |
| *H05H 1/28* | (2006.01) |

(52) U.S. Cl.
CPC ................. *H05H 1/34* (2013.01); *H05H 1/28* (2013.01); *H05H 1/3457* (2021.05)

(58) Field of Classification Search
CPC .... H05B 1/34; H05B 1/28; H05B 2001/3457; H05G 1/26
USPC ........ 219/121.5, 121.51, 121.52, 75, 121.39, 219/121.48
See application file for complete search history.

(56) References Cited

U.S. PATENT DOCUMENTS 5,334,235 A * 8/1994 Dorfman .................. C23C 4/04 420/27
10,149,376 B2 12/2018 Mitra et al.

FOREIGN PATENT DOCUMENTS

| | | |
|---|---|---|
| CA | 2289432 | 7/2000 |
| CN | 1052702 | 7/1991 |
| CN | 1179124 | 4/1998 |
| CN | 101100729 | 1/2008 |
| CN | 201543958 | 8/2010 |

(Continued)

OTHER PUBLICATIONS

Chinese Office Action, dated Apr. 26, 2021.
Japanese Office Action.

*Primary Examiner* — Mark H Paschall
(74) *Attorney, Agent, or Firm* — Jacobson Holman PLLC

(57) ABSTRACT

In the case of the nozzle protection cap (7) according to the invention for a plasma arc torch (1), is arranged and fastened at the outside on the tip of the plasma arc torch (1), at which a plasma jet emerges from the plasma arc torch (1) through nozzle-like openings (4*a*, 7*a*). The nozzle protection cap (7) is produced from an iron alloy including sulfur in a fraction of at least 0.05%.

10 Claims, 1 Drawing Sheet

(56) References Cited

FOREIGN PATENT DOCUMENTS

| | | |
|---|---|---|
| CN | 102628147 | 8/2012 |
| CN | 104505711 | 4/2015 |
| CN | 105648320 | 6/2016 |
| DE | 2703644 | 8/1977 |
| DE | 102004049445 | 4/2006 |
| EP | 0573653 | 1/1998 |
| EP | 2465334 | 6/2016 |
| JP | 52-91723 | 8/1977 |
| JP | S61174349 | 8/1986 |
| JP | 7-150308 | 6/1995 |
| JP | 2016-128609 | 7/2016 |
| JP | 2016-530098 | 9/2016 |
| WO | 2014/184656 | 11/2014 |

* cited by examiner

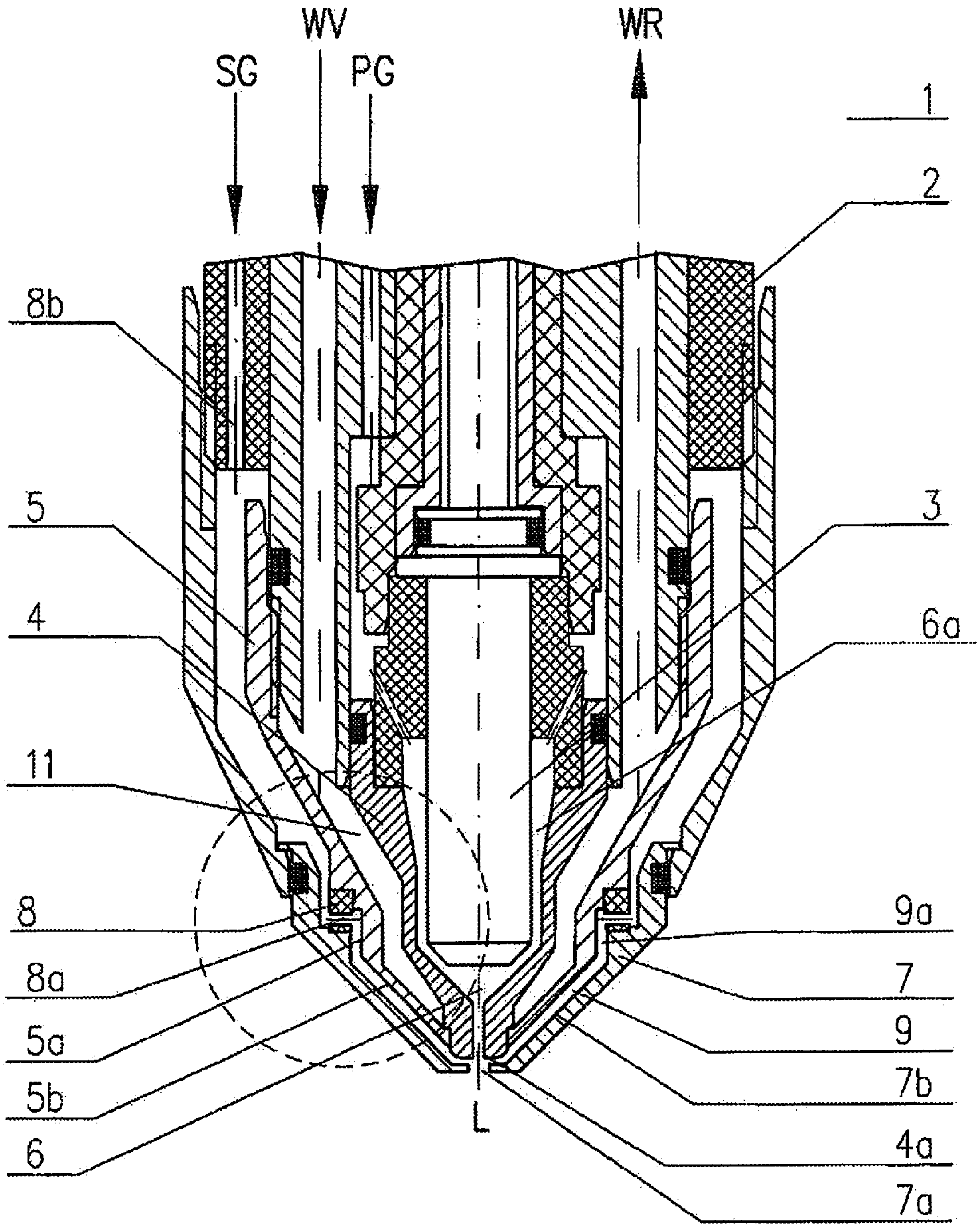
WV
WR
SG
PG
1
2
8b
5
3
4
6a
11
8
9a
8a
7
5a
9
5b
7b
6
4a
7a
L

PROTECTIVE NOZZLE CAP, PLASMA ARC TORCH COMPRISING SAID PROTECTIVE NOZZLE CAP, AND USE OF THE PLASMA ARC TORCH

BACKGROUND OF THE INVENTION

The present invention relates to a nozzle protection cap for a plasma arc torch, to a plasma arc torch having said nozzle protection cap, and to the use of the plasma arc torch.

The plasma arc torch may be used both for dry cutting but in particular also advantageously for the underwater cutting of various metallic workpieces.

In the case of plasma cutting, an arc (pilot arc) is firstly ignited between a cathode (electrode) and an anode (nozzle), and is subsequently transferred directly to a workpiece in order to perform a cut there.

Said arc forms a plasma which is a thermally highly heated, electrically conductive gas (plasma gas) which is composed of positive and negative ions, electrons and excited and neutral atoms and molecules. As plasma gas, use is made of gases such as argon, hydrogen, nitrogen, oxygen or air. These gases are ionized and dissociated by the energy of the arc. The resulting plasma jet is used for cutting the workpiece.

A modern plasma arc torch is composed substantially of a number of basic elements such as torch body, electrode (cathode), nozzle, one or more caps, in particular a nozzle cap and a nozzle protection cap which surround the nozzle, and connections which serve for the supply of electrical current, gases and/or liquids to the plasma arc torch.

Nozzle protection caps serve for protecting a nozzle, during the cutting process, against heat and sputtering molten metal of the workpiece.

A nozzle may be composed of one or more component parts. In the case of directly water-cooled plasma arc torches, the nozzle is commonly held by a nozzle cap. Cooling water flows between the nozzle and the nozzle cap. A secondary gas then flows between the nozzle cap and a nozzle protection cap. The latter serves for creating a defined atmosphere, for constricting the plasma jet and for protecting against the sputtering as the plasma jet pierces into the respective workpiece.

In the case of gas-cooled plasma arc torches and indirectly water-cooled plasma arc torches, the nozzle cap may be omitted. The secondary gas then flows between the nozzle and the nozzle protection cap.

The electrode and the nozzle are arranged in a particular spatial relationship with respect to one another and delimit a space, the plasma chamber, in which the plasma jet is formed. The plasma jet may be greatly influenced in terms of its parameters, such as for example diameter, temperature, energy density and through flow rate of the plasma gas, by the design of the nozzle and electrode.

For the different plasma gases, the electrodes and nozzles are produced from different materials and in different forms.

Nozzles and nozzle protection caps are generally produced from copper and directly or indirectly water-cooled. Depending on the cutting task and electrical power of the plasma arc torch, nozzles are used which have different inner contours and openings with different diameters and which thus provide the optimum cutting results.

For example, DE 10 2004 049 445 A1 describes a plasma arc torch with a water-cooled electrode and nozzle and with a gas-cooled nozzle protection cap. For this purpose, the secondary gas is fed through a nozzle protection cap holder, at the inside past a screw connection region between the nozzle cap holder and a nozzle protection cap, through a secondary gas channel formed between the nozzle protection cap and a nozzle cap, to a plasma jet.

EP 2 465 334 B1 presents a nozzle protection cap and a nozzle protection cap holder and a plasma arc torch. The nozzle protection cap comprises a front end portion and a rear end portion, with a thread region on the inner surface thereof for screw connection to a torch body of a plasma arc torch, wherein at least one groove passes through the thread region on the inner surface.

EP 0 573 653 B1 relates to a plasma arc torch with water-cooled electrode and nozzle and water-cooled nozzle protection cap. Exactly as in the case of the plasma arc torch as per DE 10 2004 049 445 A1, a secondary gas is, within a nozzle protection cap holder, fed at the inside past a screw connection region between the nozzle protection cap holder and a nozzle protection cap to a plasma jet.

The structural variants known per se from the prior art may also be used in principle in the case of a nozzle protection cap according to the invention and in a plasma arc torch equipped therewith.

In the described plasma torches, the nozzle protection cap is composed of copper or another non-ferrous metal, which normally exhibits particularly good thermal conductivity. In particular in the case of plasma cutting underwater, that is to say the tip of the plasma torch and thus also the nozzle protection cap are, during the cutting process, situated in the water in which the workpiece is also arranged, increased wear occurs on the surfaces of the bore of the nozzle protection cap during the piercing or cutting. This leads to a deterioration of the cut quality, because the gas flow of the secondary gas is disrupted. Furthermore, the useful service life is shortened, which leads to more frequent exchange and downtimes. This is caused in particular by electro-erosive processes, for example the spark discharge during the ignition, electrochemical processes, and physical overloading of the material owing to temperature and/or cavitation.

A further problem is the required mechanical strength of the nozzle protection caps, in particular if the tip of the plasma torch and thus also the nozzle protection cap comes into contact with the workpiece. This can lead to defamation of the nozzle protection cap and likewise results in a deterioration of the cut quality owing to the disruption of the gas flow of the secondary gas.

SUMMARY OF THE INVENTION

The invention is thus based on the object of improving the service life of the nozzle protection cap of a plasma arc torch. This relates in particular to plasma cutting underwater. Furthermore, it is the intention to be able to keep the cut quality constantly high over a relatively long time period, and it is sought to reduce the risk of mechanical damage to the nozzle protection cap. At the same time, it is the intention for the nozzle protection cap to exhibit good thermal conductivity in order to avoid overheating.

According to the invention, said object is achieved by means of a nozzle protection cap which has the features of the claims.

Advantageous embodiments and refinements of the invention may be realized with features specified in dependent claims.

The nozzle protection cap according to the invention for a plasma arc torch is arranged and fastened at the outside on the tip of the plasma arc torch, at which a plasma jet emerges from the plasma arc torch through nozzle-like openings. Said nozzle protection cap is produced from an iron alloy including sulfur in a fraction of at least 0.05%.

It is the intention for the iron alloy to include sulfur in a fraction in the range from 0.05% to 0.5%, preferably in a fraction in the range from 0.1% to 0.4%, particularly preferably in the range from 0.15% to 0.35%.

Aside from the sulfur, at least one further additional alloy element selected from chromium, nickel, manganese, molybdenum, niobium, titanium, tungsten and vanadium may be included.

One or more additional alloy elements may be included in a fraction of at most 35%. Here, the respective individual fractions of multiple additional alloy elements amounts to at most 35% in sum total. It is however the intention for the fraction of one or more additional alloy elements, aside from the sulfur, to amount to at least 5%. Aside from the fraction of alloy elements and sulfur, it is the intention for the material used for the nozzle protection cap according to the invention to comprise only iron.

It is the intention for chromium and nickel to be jointly included in the iron alloy as additional alloy elements.

It is expediently the intention for the iron alloys to comprise no carbon or a very small fraction of carbon. It is the intention for the carbon fraction to be limited to a maximum fraction of 2.1%, preferably a maximum fraction of 1.2%, particularly preferably a fraction of at most 0.5%.

It is also the intention for the iron alloy to include less than 0.1%, preferably less than 0.05%, cobalt, and particularly preferably no cobalt.

It is the intention for the iron alloy used for the production of the nozzle protection cap to have a thermal conductivity of at least 10 W/m*K, have a hardness of at least HB 150, and/or be oxidation-resistant and corrosion-resistant under normal ambient or usage conditions. Here, "normal" is to be understood to mean a conventional ambient atmosphere and use in water which comprises at least no chemically aggressive substances, or an additional introduction of energy is performed.

It is the intention for a plasma arc torch to which a nozzle protection cap according to the invention is fastenable to at least be designed so as to have a torch body, an electrode arranged on the torch body, a nozzle which has a central nozzle opening and which is arranged so as to cover the electrode in a manner separated by a plasma gas channel formed between said nozzle and electrode. It is the intention for the nozzle protection cap, which has an outlet opening, arranged at the front end side of said nozzle protection cap and situated opposite the nozzle opening, and a ring-shaped secondary gas channel within the nozzle protection cap, which secondary gas channel is connected to the outlet opening, to be detachably fastened to the plasma arc torch. It is the intention for the nozzle protection cap to be electrically insulated with respect to the electrode and the nozzle and form a secondary gas guide part, which has at least one passage.

A plasma arc torch equipped with a nozzle protection cap according to the invention may be used for cutting workpieces. Here, at least the nozzle protection cap and the respective workpiece are arranged below a water surface.

DESCRIPTION OF THE DRAWINGS

The invention will be discussed in more detail by way of example below.

In the FIGURE:

FIG. 1 shows a sectional illustration through a plasma arc torch with a nozzle protection cap according to the invention.

DETAILED DESCRIPTION OF THE INVENTION

FIG. 1 shows a plasma torch 1 according to a particular embodiment of the invention. The plasma torch 1 has a torch body 2 with an electrode 3 and a nozzle 4, which are of substantially rotationally symmetrical form about the longitudinal axis L of the plasma torch 1. The electrode 3 and the nozzle 4 are arranged coaxially in the torch body 2, are situated in a particular spatial relationship, and form a plasma chamber 6, through which there flows a plasma gas PG which is fed via a plasma gas channel 6*a*. A nozzle cap 5 is arranged coaxially with respect to the longitudinal axis L of the plasma torch 1, and holds and surrounds the nozzle 4 with a protective action. Between the nozzle 4 and the nozzle cap 5, there is situated a chamber 11 through which cooling water flows. The cooling water is fed via a water feed WV and flows out via a water return WR.

A ring-shaped secondary gas guide part 8 with a multiplicity of passages, in particular in the form of bores, of which only one is denoted by the reference designation 8*a*, is arranged in a secondary gas channel 9 formed between the nozzle cap 5 and a nozzle protection cap 7, between a secondary gas inlet 8*b* and the front end of the secondary gas channel 9, such that the secondary gas SG flowing through the passages 8*a* impinges on the outer shell surface of the nozzle cap 5. The secondary gas SG is subsequently conducted through the secondary gas channel 9, which is delimited by the shell surface of the nozzle cap 5 and by the inner surface 7*b* of the nozzle protection cap 7, to the front end of the plasma torch 1, is then fed to a plasma jet (not shown), and emerges through an outlet opening 7*a* of the nozzle protection cap 7. The rotating secondary gas SG flows around the plasma jet after it emerges from a nozzle opening 4*a*, and additionally creates a defined atmosphere around the plasma jet.

The passages 8*a* of the secondary gas guide part 8 are arranged such that a rotating flow of the secondary gas SG is realized. For example, the passages 8*a* in the secondary gas guide part 8*a* may be arranged equidistantly over the circular circumference of the secondary gas guide part 8 and so as to extend radially or with an offset with respect to the radial, that is to say so as to be oriented toward a point in each case offset with respect to the actual circle central point.

It is also possible for the torch to have no nozzle cap 5, and for the nozzle 4 to be screwed into the torch body 2, for example. Then, the chamber 5 through which the secondary gas SG flows is delimited by the shell surface of the nozzle 4 and by the inner surface 7*b* of the nozzle protection cap 7.

In the case of this plasma arc torch, use may, according to the invention, be made of a nozzle protection cap 7 as claimed in any of claims 1 to 8. In a specific individual example, the nozzle protection cap 7 may be composed of an alloy which has been produced with iron and additionally 17 to 19% chromium, 8% to 10% nickel and 0.15% to 0.35% sulfur. The maximum carbon fraction may amount to 0.1%.

REFERENCE DESIGNATIONS

1 Plasma torch
2 Torch body
3 Electrode
4 Nozzle
4*a* Nozzle opening
5 Nozzle cap
6 Plasma chamber
6*a* Plasma gas channel
7 Nozzle protection cap
7*a* Outlet opening
7*b* Inner surface
8 Secondary gas guide part
8*a* Passage
8*b* Secondary gas inlet
9 Secondary gas channel
L Longitudinal axis
PG Plasma gas
SG Secondary gas
WV Water feed
WR Water return

The invention claimed is:

1. A nozzle protection cap for a plasma arc torch, which nozzle protection cap is arranged and fastened at the outside on the tip of the plasma arc torch, at which a plasma jet emerges from the plasma arc torch through nozzle-like openings;

wherein the nozzle protection cap is produced from an iron alloy including sulfur in an amount of at least 0.05% and cobalt in the amount of less than 0.1%.

2. The nozzle protection cap as claimed in claim 1, wherein the iron alloy includes sulfur in an amount in the range from 0.05% to 0.5%.

3. The nozzle protection cap as claimed in claim 1, wherein aside from the sulfur, there is at least one further additional alloy element selected from chromium, nickel, manganese, molybdenum, niobium, titanium, tungsten or vanadium.

4. The nozzle protection cap as claimed claim 3, wherein one or more additional alloy elements is/are included in an amount of at most 35%.

5. The nozzle protection cap as claimed in claim 4, wherein either chromium and nickel are included as additional alloy elements.

6. The nozzle protection cap as claimed in claim 1, wherein either no carbon is included, or carbon is included in a maximum amount of 2.1%.

7. The nozzle protection cap as claimed in claim 1, wherein the iron alloy has a thermal conductivity of at least 10 W/m*K, a hardness of at least HB 150, or is oxidation-resistant and corrosion-resistant under normal ambient or usage conditions.

8. A plasma arc torch having a torch body, having an electrode arranged in the torch body, having a nozzle which has a central nozzle opening and which is arranged so as to cover the electrode in a manner separated by a plasma gas channel formed between the nozzle and the electrode, a nozzle protection cap which has an outlet opening, arranged at the front end side of the nozzle protection cap and situated opposite the control nozzle opening, and a ring-shaped secondary gas channel within the nozzle protection cap, which ring-shaped secondary gas channel is connected to the outlet opening, wherein the nozzle protection cap is arranged so as to be electrically insulated with respect to the electrode and the nozzle, and a secondary gas guide part, which has at least one passage, the nozzle protection cap is detachably fastened to the plasma arc torch, wherein the nozzle protection cap is designed as claimed in claim 1.

9. The nozzle protection cap as claims in claim 1, wherein the inner alloy includes sulfur in an amount in the range of from 0.1% to 0.4% and a maximum amount of carbon of 1.2%.

10. The nozzle protection cap as claimed in claim 1, wherein the inner alloy includes Sulphur in the range of from 0.15% to 0.35% and a maximum amount of carbon of 0.5%.

* * * * *